(12) United States Patent
Zapiach

(10) Patent No.: US 12,325,383 B2
(45) Date of Patent: Jun. 10, 2025

(54) MOTORIZED RACK FOR A VEHICLE

(71) Applicant: Luis A. Zapiach, Tenafly, NJ (US)

(72) Inventor: Luis A. Zapiach, Tenafly, NJ (US)

( * ) Notice: Subject to any disclaimer, the term of this patent is extended or adjusted under 35 U.S.C. 154(b) by 0 days.

(21) Appl. No.: 17/882,785

(22) Filed: Aug. 8, 2022

(65) Prior Publication Data

US 2023/0042341 A1  Feb. 9, 2023

Related U.S. Application Data

(60) Provisional application No. 63/230,451, filed on Aug. 6, 2021.

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .................................. B60R 9/06; B60R 9/10
USPC ....................................................... 224/522
See application file for complete search history.

(56) References Cited

U.S. PATENT DOCUMENTS

| | | | | |
|---|---|---|---|---|
| 5,377,886 A * | 1/1995 | Sickler | ...................... | B60R 9/10 224/558 |
| 5,549,231 A * | 8/1996 | Fletcher | ................... | B60R 9/06 211/20 |
| 5,560,498 A * | 10/1996 | Porter | ...................... | B62H 3/08 211/20 |
| 5,579,972 A * | 12/1996 | Despain | .................... | B60R 9/06 224/521 |
| 5,579,973 A * | 12/1996 | Taft | .......................... | B60R 9/06 224/495 |
| 6,761,297 B1* | 7/2004 | Pedrini | ..................... | B60R 9/10 224/570 |
| 6,968,986 B1* | 11/2005 | Lloyd | ....................... | B60R 9/06 224/511 |
| D528,064 S * | 9/2006 | Ezra | ............................ | D12/408 |
| 8,272,547 B1* | 9/2012 | Mital | ........................ | B60R 9/10 224/501 |
| 9,096,182 B1* | 8/2015 | Roth | ....................... | B60R 11/00 |
| 9,233,634 B1* | 1/2016 | Level | ...................... | B60P 3/077 |
| 9,550,444 B1* | 1/2017 | Ferreira | ................. | B60P 3/077 |
| 9,555,744 B1* | 1/2017 | Roth | ........................ | B60R 9/10 |
| 10,266,123 B1* | 4/2019 | Faynor | ..................... | B60R 9/06 |
| 10,577,040 B1* | 3/2020 | Goates | ..................... | B62H 3/12 |
| 11,673,511 B2* | 6/2023 | Shaw | ....................... | B60R 9/06 414/462 |
| 2003/0099531 A1* | 5/2003 | Williams | ................ | B60P 3/122 414/540 |
| 2003/0164390 A1* | 9/2003 | Higginbotham, III | .... | B60R 9/10 224/533 |
| 2005/0082328 A1* | 4/2005 | Lo | ............................ | B60R 9/10 224/924 |
| 2006/0029483 A1* | 2/2006 | Allen | ....................... | B60R 9/10 410/30 |

(Continued)

*Primary Examiner* — Peter N Helvey
(74) *Attorney, Agent, or Firm* — Gearhart Law, LLC

(57) ABSTRACT

The present disclosure provides for a motorized rack having at least one motor, a plurality of attachment mechanisms, and lift mechanism coupled to the at least one motor. The motorized rack may be coupled to the back of a vehicle, provide for a mechanism to attach items, such as a bicycle, to the motorized rack, and will have at least one motor to raise and lower the attached items.

8 Claims, 15 Drawing Sheets

(56) References Cited

U.S. PATENT DOCUMENTS

| | | | | |
|---|---|---|---|---|
| 2007/0000962 | A1* | 1/2007 | Reeves | B60R 9/06 |
| | | | | 224/536 |
| 2008/0073395 | A1* | 3/2008 | Reeves | B60R 9/10 |
| | | | | 224/324 |
| 2008/0164292 | A1* | 7/2008 | Farney | B60R 9/06 |
| | | | | 224/324 |
| 2008/0290627 | A1* | 11/2008 | Gilbert | B60R 9/06 |
| | | | | 280/204 |
| 2011/0132946 | A1* | 6/2011 | Sautter | B60R 9/045 |
| | | | | 224/324 |
| 2013/0062383 | A1* | 3/2013 | Jeli | B60R 9/10 |
| | | | | 224/549 |
| 2014/0144960 | A1* | 5/2014 | Condon | B60R 9/048 |
| | | | | 224/324 |
| 2014/0308101 | A1* | 10/2014 | Brutsaert | B60R 9/10 |
| | | | | 414/462 |
| 2015/0076200 | A1* | 3/2015 | Pedrini | B60R 9/10 |
| | | | | 224/570 |
| 2015/0314734 | A1* | 11/2015 | Robinson | B60R 9/10 |
| | | | | 414/462 |
| 2016/0068110 | A1* | 3/2016 | Prescott | B60R 9/06 |
| | | | | 224/539 |
| 2017/0320447 | A1* | 11/2017 | Dunlap | B60P 1/02 |
| 2018/0022286 | A1* | 1/2018 | Settelmayer | E05B 71/00 |
| | | | | 224/42.25 |
| 2018/0072237 | A1* | 3/2018 | Kuschmeader | B60R 9/10 |
| 2018/0147996 | A1* | 5/2018 | Caglarcan | B60R 9/10 |
| 2018/0201202 | A1* | 7/2018 | Phillips | B60R 9/10 |
| 2019/0152406 | A1* | 5/2019 | Shaw | B60R 9/10 |
| 2019/0161022 | A1* | 5/2019 | McFadden | B60R 9/10 |
| 2020/0406830 | A1* | 12/2020 | Owen | B62H 3/12 |
| 2022/0242330 | A1* | 8/2022 | Doherty | B60R 9/045 |
| 2022/0410810 | A1* | 12/2022 | Morrill | B60R 9/06 |

* cited by examiner

MOTORIZED RACK FOR A VEHICLE

CROSS-REFERENCE TO RELATED APPLICATIONS

This application claims priority to U.S. Application Ser. No. 63/230,451, filed on Aug. 6, 2021, the contents of which are herein fully incorporated by reference in its entirety.

FIELD OF THE EMBODIMENTS

The field of the present invention and its embodiments relate to an apparatus for securing items to a vehicle. In particular, the present invention and its embodiments relate to an apparatus that may be attached to the back of a vehicle, provide for a mechanism to attach items to the apparatus, and have at least one motor to raise and lower the attached items.

BACKGROUND OF THE EMBODIMENTS

Recent years have seen a resurgence of interest in many outdoor sports requiring a variety of different sporting equipment. Not only has bicycling, as one may traditionally perceive it, enjoyed a new surge of interest, but the interest in bicycling has also branched off into a new direction, namely, off-road or mountain biking as well as electric bicycles (e-bikes). In order to get the equipment to the final destination, one must have an adequate means of transporting it. Often bicycles and other equipment are too large to fit in many vehicles.

As such, various methods of sporting equipment transportation are used, including on top or in the back of one's vehicle. One popular mode of transporting bicycles is the use of a stationary bicycle rack, supported on a vehicle rooftop or the back frame of the vehicle.

A potential difficulty with the presently known rooftop bicycle racks arises when multiple bicycles are transported and even getting the bicycles onto the vehicle roof without causing damage to the vehicle.

These and other shortcomings and inconveniences of the presently known rooftop bicycle transportation systems are addressed and nullified by embodiments of the present invention. With the motorized rack system of the present invention, any user can more safely and conveniently load a bicycle onto or retrieve a bicycle from a bicycle rack system according to the invention.

Further, regardless of whether one or multiple bicycles are being transported, no logistical planning is required to load or retrieve any one bicycle using the present invention. That is, the bicycles or other sporting equipment do not have to be removed in order to access the equipment toward the center of the vehicle. Each piece may be loaded and retrieved independently.

REVIEW OF RELATED TECHNOLOGY

U.S. Pat. No. 10,124,852 pertains to a lift assembly for a vehicle that includes a bracket configured to be fixed to the vehicle. A lift arm is pivotally coupled to the bracket. A mating structure is supported by the lift arm. The mating structure is configured to lift a personal mobility device and includes an electrical connector for electrically mating to an electrical connector of the personal mobility device.

U.S. Pat. No. 9,987,994 pertains to a bicycle rack system that has wheel trays spaced apart along a first edge of a roof of a vehicle, a support arm extensible and retractable in length, supported by a pivot mechanism near a second edge of the roof of the vehicle, the support arm extensible to a maximum length substantially greater than the width of the roof, and a specific length substantially less than the width of the roof, and a capture mechanism on a free end of the support arm, adapted to capture a part of the bicycle to be carried in the bike rack.

U.S. Pat. No. 5,690,259 pertains to a modular bicycle rack system that is useful with a vehicle that has a pair of rooftop transverse load bars that are spaced along the length of the vehicle. The rack system includes a base that is connected with the transverse load bars, and which may be one or more rail members, a slide connected in sliding engagement with the base to slide between a forward and a rearward position, a frame that is pivotally connected with the slide to pivot between an upper and a lower position, and which may be a channel member, and a clamp that connects between the base and the frame. A hanger releasably locks onto the frame to hang a bicycle on the frame when the frame is in the lower position. Alternatively, a cargo box may be coupled with the frame for convenient access to the cargo box.

U.S. Pat. No. 5,294,006 pertains to an elongate track member that includes a spring-biased slide block, with the slide block arranged for inter-engaging and locking relative to the track structure. The slide block includes a U-shaped clamp bar having spaced legs, with each leg including a clamp jaw to secure a bicycle frame there within. The spring structure within the track member permits ease of lowering and raising of the organization.

U.S. Patent Application 2007/0175936 pertains to a rack for a vehicle roof comprising a mechanized device for loading and unloading cargo onto and from a roof of a motor vehicle for transport. The rack includes a pair of horizontal support frame members mounted either directly on the roof of the vehicle, or onto an existing vehicle roof rack. A cargo carrying rack is mounted on cargo carrying arms, which are pivotally and slidably attached to a pair of traveling support arms that are, in turn, pivotally and slidably linked to the frame members. In some embodiments, a motor and gear train raise and lower the cargo carrying rack to and from the roof for loading and unloading cargo. In other embodiments, the cargo carrying rack is raised and lowered manually, with articulated stabilizer arms having a ratchet mechanism at one end and a spring-biased pulley at the other end dampening the speed of deployment.

U.S. Patent Application 2007/0007316 pertains to a bicycle carrier providing a rotatable beam on which are mounted foldable support arms having first wheel support means for engaging and entrapping the upper peripheral regions of the wheels of a bicycle, the beam being rotatable into a bicycle carriage mode vertically above the vehicle when the arms are in an arm deployed position and lockable in that position. Resiliently biased detent means are associated with the support arms mountings for positively locking the arms in the deployed position in relation to the beam, simple movement against the bias affecting disengagement.

Various systems and methodologies are known in the art. However, their structure and means of operation are substantially different from the present disclosure. The other inventions fail to solve all the problems taught by the present disclosure. At least one embodiment of this invention is presented in the drawings below and will be described in more detail herein.

BRIEF SUMMARY OF THE EMBODIMENTS

The present invention and its embodiments teach and describe a rack configured for use with a vehicle. The rack may be a motorized rack or may operate through other means such as hydraulics and/or linear actuator(s). "Motor" or "motorized" for the purposes of this application means a device "that transforms electrical energy into mechanical energy." Any non-motor or non-motorized or other means of energy transformation and/or movement may be related to but is not limited to pneumatics, hydraulics, chains, pulleys, electromagnets, magnets, and the like or some combination thereof.

The rack is configured to be coupled to a hitch of the vehicle and provide multiple locations for a bicycle or other apparatus to be coupled thereto for safe storage and/or transport. The rack may be loaded with the bicycle(s) at a ground level and then automatically (via depressible button, mobile application, etc.) raise the bicycle(s) to an elevated storage and/or transport position. The rack is configured to have mechanisms to receive a wheel of the bicycle(s) as well as support the bicycle(s) during transport to prevent movement of the bicycle(s) during transport. When desired, a user simply causes the rack to lower the bicycle(s) to a ground-level where they may be removed from the rack.

In one aspect of the present invention there is a rack for a vehicle, that includes at least one motor, securement mechanism, attachment mechanism, where the attachment mechanism is configured to secure an apparatus to be attached to the motorized rack for storage, at least one support mechanism configured to support a weight of the apparatus, a first lifting mechanism operatively coupled to the at least one motor, a second lifting mechanism operatively coupled to the at least one motor, where a position of the first lifting mechanism and the second mechanism are staggered, and a rack arm configured to raise and lower the first lifting mechanism and the second lifting mechanism.

In another aspect of the present invention there is a rack for a vehicle, that includes a rack arm configured to raise and lower an apparatus coupled to the motorized rack, at least one front wheel well and at least one rear wheel well, securement mechanism configured to secure a position of the apparatus within either of the front wheel well the at least one rear wheel well, yoke configured to engage a body of the apparatus as the apparatus is raised to an elevated position, a first lifting mechanism operatively coupled to the rack arm, a second lifting mechanism operatively coupled to the rack arm, where a position of the first lifting mechanism and the second mechanism are staggered, and where the first lifting mechanism and the second lifting mechanism are configured to offset two or more apparatus from one another.

In yet another aspect of the present invention there is a vehicle rack that includes a first platform, a second platform, a rack arm coupled to the first platform and the second platform, a stanchion positioned between the first platform and the second platform, securement mechanism coupled to the stanchion, where the rack arm is configured to raise and lower the first platform and the second platform.

The rack may also include where the attachment mechanism is a front wheel well.

The rack may also include where the attachment mechanism is a rear wheel well.

The rack may also include further include a memory, a processor, and wireless transceiver.

The rack may also include further includes at least one electrical receptacle.

The rack may also include where at least one electrical receptacle is coupled to a battery of the vehicle and configured to provide a charging source to the apparatus.

The rack may also include where the motorized rack is coupled to a hitch of the vehicle.

The rack may also include where the support mechanism engages the apparatus as the apparatus is raised to an elevated position.

The rack may also include where the first lifting mechanism is a first hydraulic arm.

The rack may also include where the second lifting mechanism is a second hydraulic arm.

The rack may also include where the support mechanism has a first prong and a second prong with the first prong and the second prong being coupled at a second end of each of the first prong and the second prong.

The rack may also include where the apparatus is a bicycle.

The rack may also include where the bicycle is an electric bicycle. Other technical features may be readily apparent to one skilled in the art from the following figures, descriptions, and claims.

In yet another aspect of the present invention there is a vehicle rack having a first platform with a first end and a second end; a first securement mechanism and a second securement mechanism coupled to the first platform; a locking arm coupled to the first end of the first platform; a rack arm coupled to the first platform; a stanchion positioned between the first platform and the vehicle, wherein the stanchion is configured to raise and lower the first platform.

In still another aspect of the present invention there is a vehicle rack having a first platform with a first end and a second end, wherein a first securement mechanism and a second securement mechanism is coupled to the first platform; a second platform having a first end and a second end, wherein a first securement mechanism and a second securement mechanism is coupled to the second platform; a first locking arm coupled to the first end of the first platform; a second locking arm coupled to the first end of the second platform; a rack arm coupled to the first platform and the second platform; a stanchion positioned between the first platform and the vehicle, wherein the stanchion is configured to raise and lower the first platform and the second platform.

In general, the present invention succeeds in conferring the following, and others not mentioned, benefits and objectives.

It is an object of the present invention to provide a mechanism for easily lifting bicycles from a ground level to an elevated transport position.

It is an object of the present invention to provide a mechanism that can be readily attached to and removed from a vehicle.

It is an object of the present invention to provide a mechanism that allows proper storage and transportation of items.

It is an object of the present invention to provide a mechanism that is lightweight and efficient.

It is an object of the present invention to provide a mechanism that is automated.

It is an object of the present invention to provide a mechanism that allows for storage of multiple bicycles without allowing the bicycles to damage one another.

It is an object of the present invention to provide a mechanism that securely stores bicycles for transport.

DETAILED DESCRIPTION OF THE EMBODIMENTS

Figure 1:
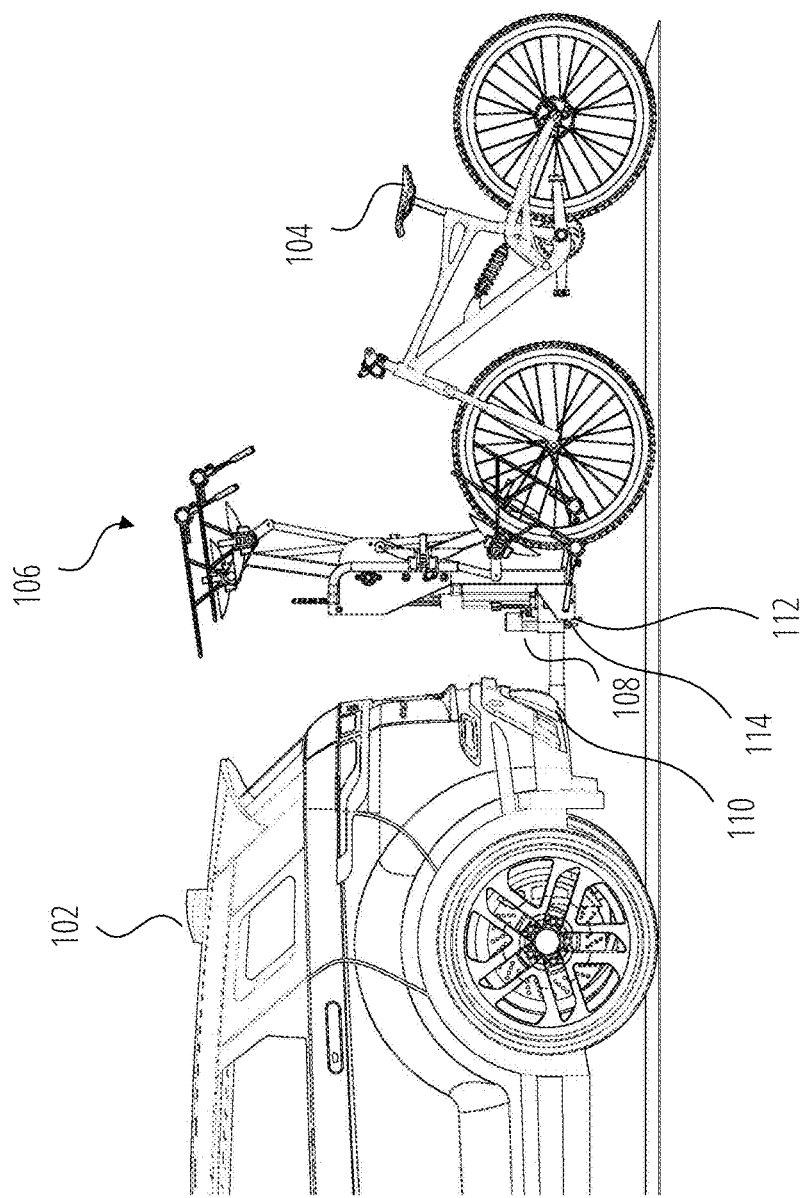
FIG. 1 illustrates a side view of bicycles attached to an embodiment of the present invention and resting upon a ground level.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Described herein is a rack system to be utilized with at least one vehicle 102. The vehicle 102 may be virtually any motorized or non-motorized vehicle 102 capable of transporting occupants and/or cargo. For illustrative purposes, the vehicle 102 here is reflected as a sport utility vehicle (SUV). Further shown are bicycles 104, a rack 106, at least one motor 108, a hitch 110, a memory 112, and a processor 114. The rack 106 is preferably coupled to the vehicle 102 via the hitch 110 of the vehicle 102. In some embodiments, the rack 106 may be attached directly to a frame or other portion of the vehicle.

The present application may further refer to apparatus or bicycles 104 that may be held by the rack 106. Virtually any item capable of transport may be secured or utilized within the purview of the present application. Further, as it relates to bicycles 104, virtually any bicycle may be used including road bicycles, racing bicycles, mountain bicycles, etc.

The rack 106 generally comprises the features shown in FIGS. 3 and 5-6 as described below. More generally, the rack 106 has at least one motor 108 operable to raising and lowering the rack 106 and a memory 112 and processor 114. Such features allow for the rack 106 to be programmed or work with external programs (such as a mobile application) for controlling of the rack 106. Such components are preferably retained within a housing of the rack 106 to protect the components from the elements and general wear and tear. Here, as shown, the bicycles 104 are positioned on a ground level or a lowered position. The embodiments of the present invention are intended to raise the bicycles 104 or other apparatus to be transported via the rack 106 for safe transport and storage.

The rack 106 may be configured to allow a bicycle 104 to remain flat on the ground in a lowered position and substantially clear and free of the ground in an elevated position to avoid contact with a road or ground surface during transport.

The rack may provide additional functionality such a storage compartments and charging capabilities for electric bicycles (e-bikes) and other electric based apparatus. Such a rack may have an onboard power source (generator, battery, etc.) or may draw power from the vehicle's battery to which vehicle the rack is connected.

Figure 2:
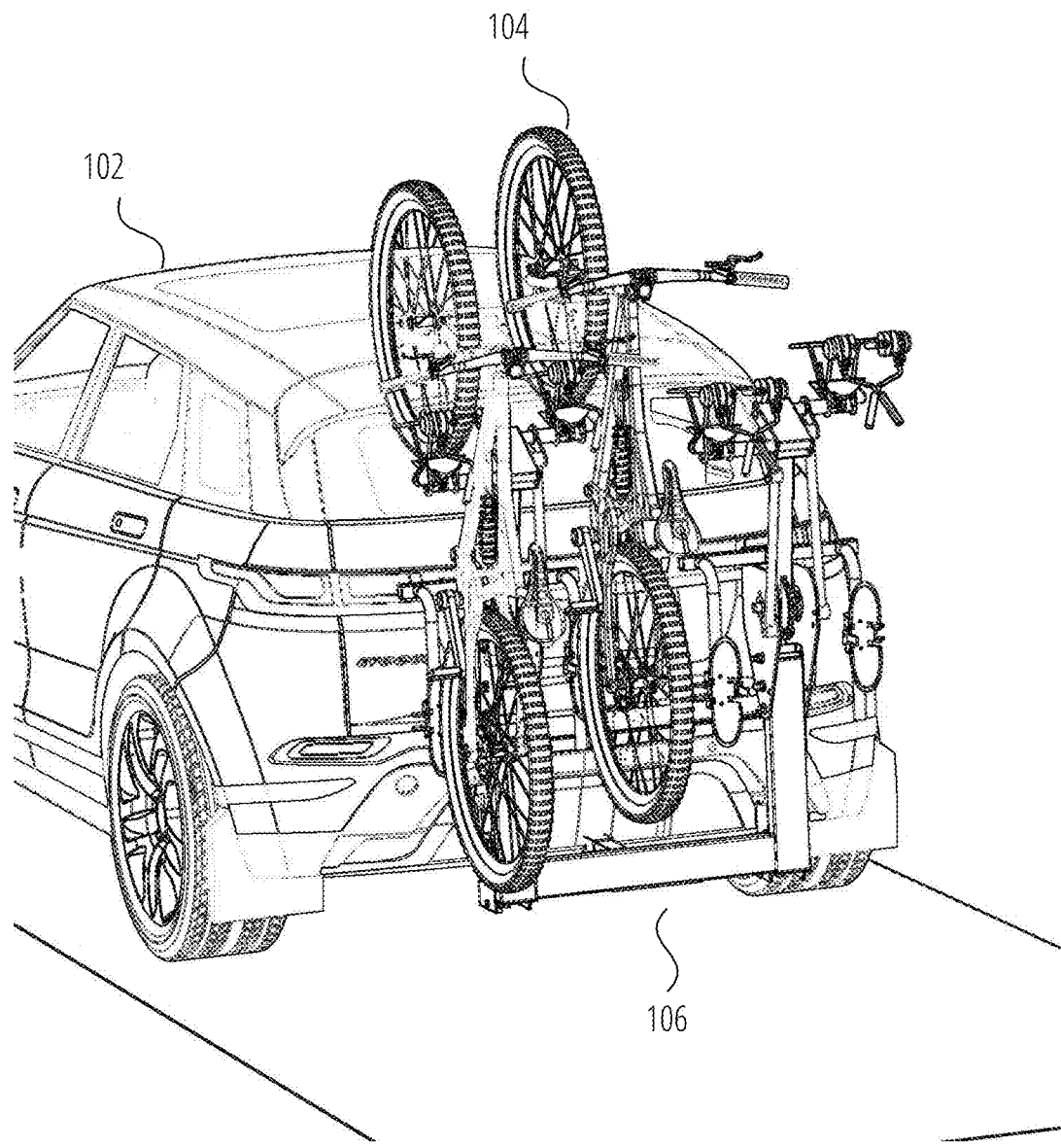
FIG. 2 illustrates a side view of bicycles attached to an embodiment of the present invention and resting upon an elevated level.

As shown in FIG. 2, there is a vehicle 102, a bicycle 104, and a rack 106. Here, the bicycles 104 are positioned in an elevated position or storage position ready to be transported. Further description of the mechanisms of action of the rack 106 will be described herein.

Figure 3:
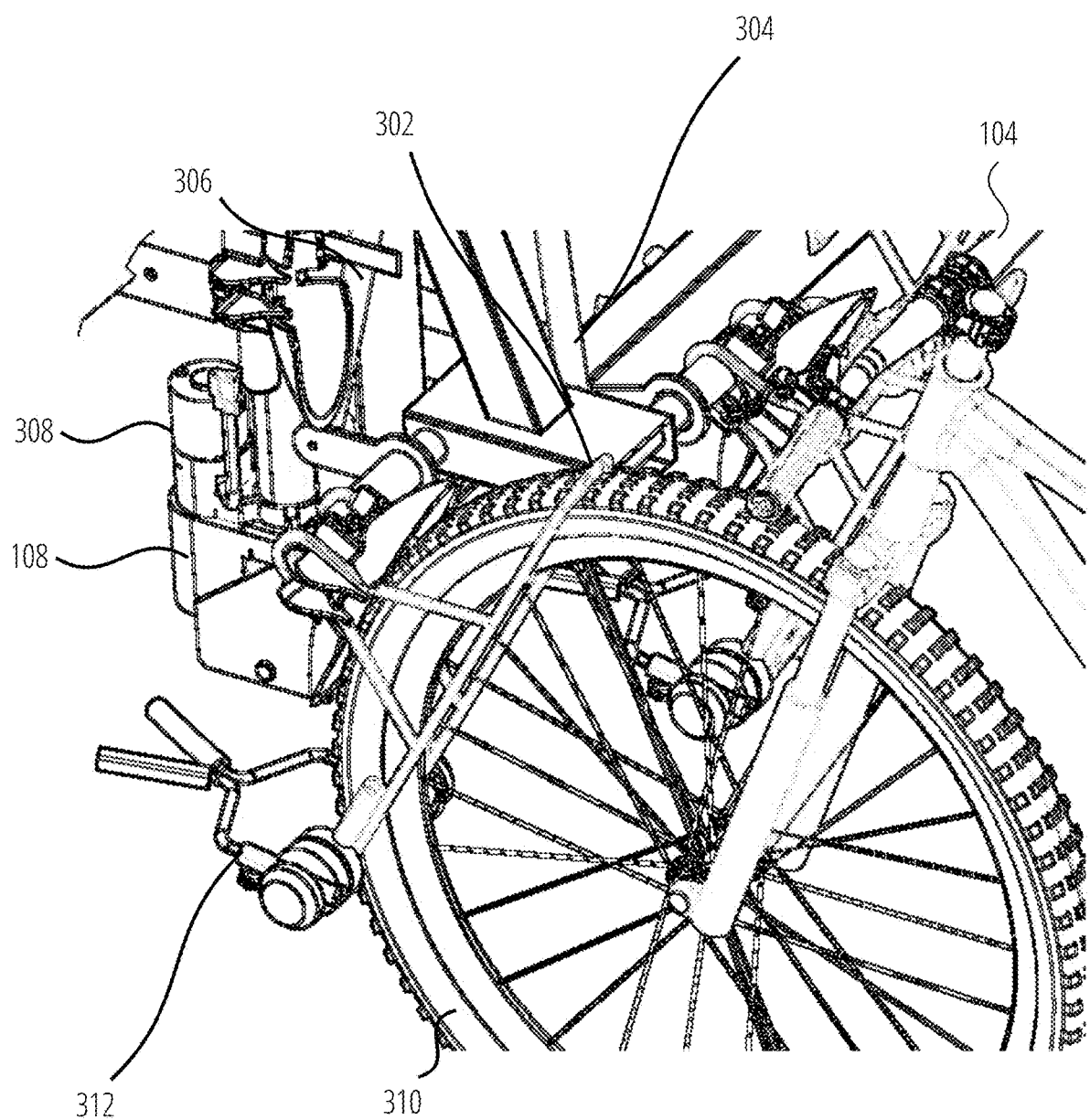
FIG. 3 illustrates a close-up view of a wheel securement mechanism of the present invention.

More specifically, FIG. 3, illustrates a front wheel well 302, a first lifting mechanism 304, a second lifting mechanism 306, a rack arm 308, a front wheel 310, and a yoke 312. Shown here in FIG. 3 is a close-up view of the structures involved with coupling bicycles 104 to the rack 106.

In use, a user will want to guide the front wheel 310 of the bicycle 104 to the front wheel well 302. The front wheel well 302 forms a basket-like receptacle that is shaped to allow the front wheel 310 of the bicycle 104 to reside therein. Once properly positioned, a securement mechanism, such as a strap (not shown) may be used to secure the front wheel 310 in the front wheel well 302.

Coupled to a lower end (when in a lowered position) of the front wheel well 302 is the yoke 312. The yoke 312 is further described and shown in FIG. 5. The yoke 312 is positioned and sized to "catch" the frame of the bicycle 104 as the bicycle 104 rotates about front wheel 310 as it is raised from the lowered position to an elevated position. The yoke 312 may be configured to rotate automatically as the rack 106 is raised or lowered or may be manually manipulated as desired.

To raise and lower the rack 106 are at least a first lifting mechanism 304 and a second lifting mechanism 306. Such lifting mechanisms may be embodied as hydraulic arms. The position and length of the first lifting mechanism 304 and the second lifting mechanism 306 are such that the overall position of bicycles 104 coupled to the rack 106 will be staggered as shown in FIG. 2. The lifting mechanisms cause the bicycles 104 to ultimately reside at differing heights and positions to thereby not interfere with the positions of one another. The first lifting mechanisms 304 and the second lifting mechanism 306 are operably coupled to at least one motor 108. As the motor 108 is activated, causing the bicycles 104 to be raised by the rack 106, a progression of the same is shown in the following drawings.

Figure 4A:
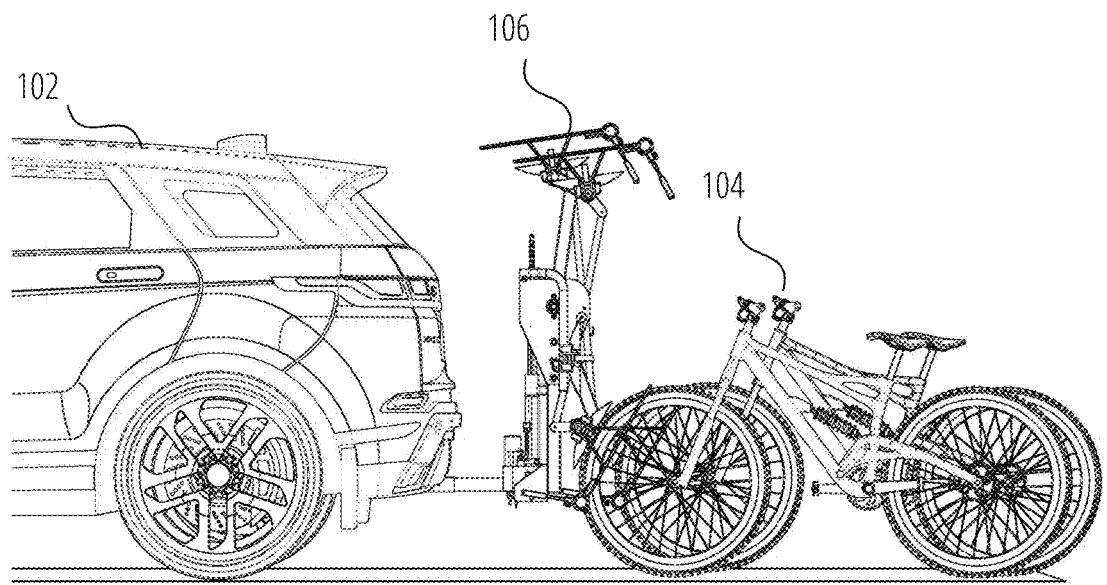
FIG. 4A illustrates a side view of bicycles attached being lifted from a ground level to an elevated level.
Figure 4B:
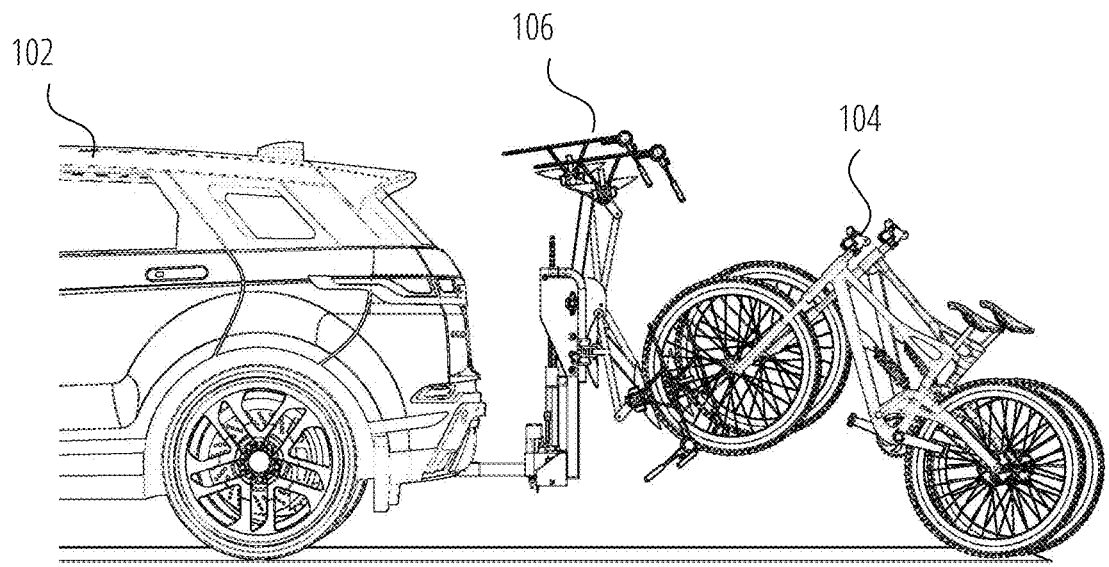
FIG. 4B illustrates a side view of bicycles attached being lifted from a ground level to an elevated level.
Figure 4C:
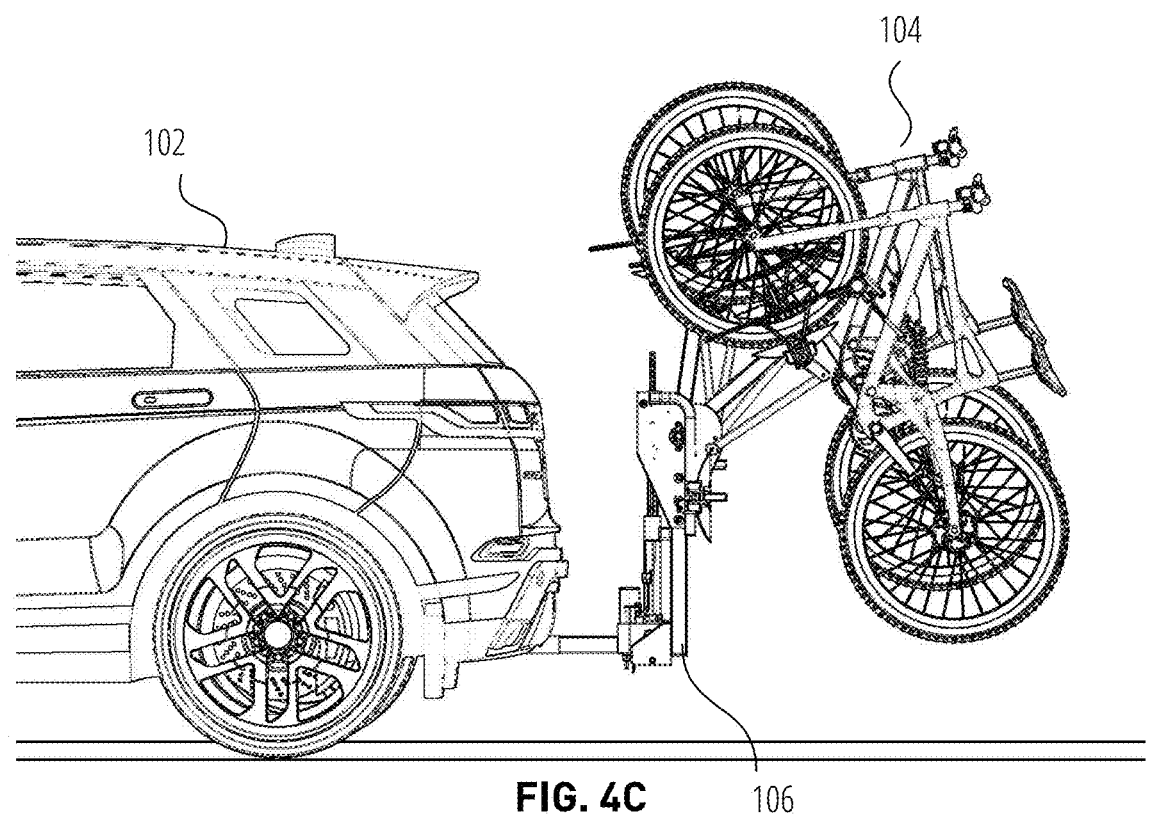
FIG. 4C illustrates a side view of bicycles attached being lifted from a ground level to an elevated level.
Figure 4D:
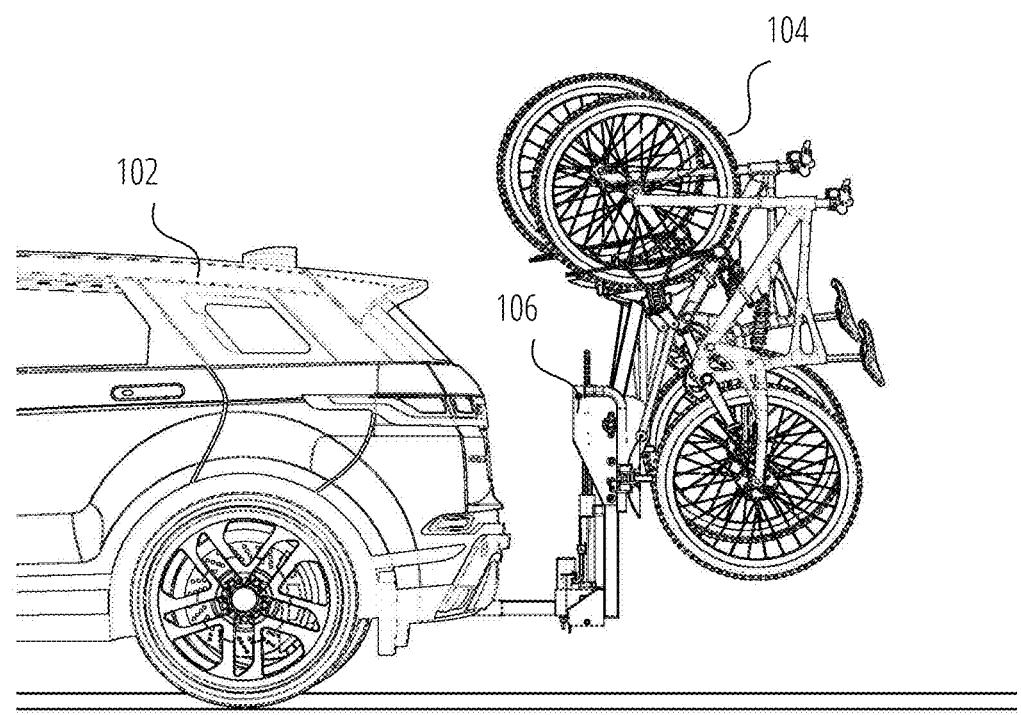
FIG. 4D illustrates a side view of bicycles attached being lifted from a ground level to an elevated level.
Figure 4E:
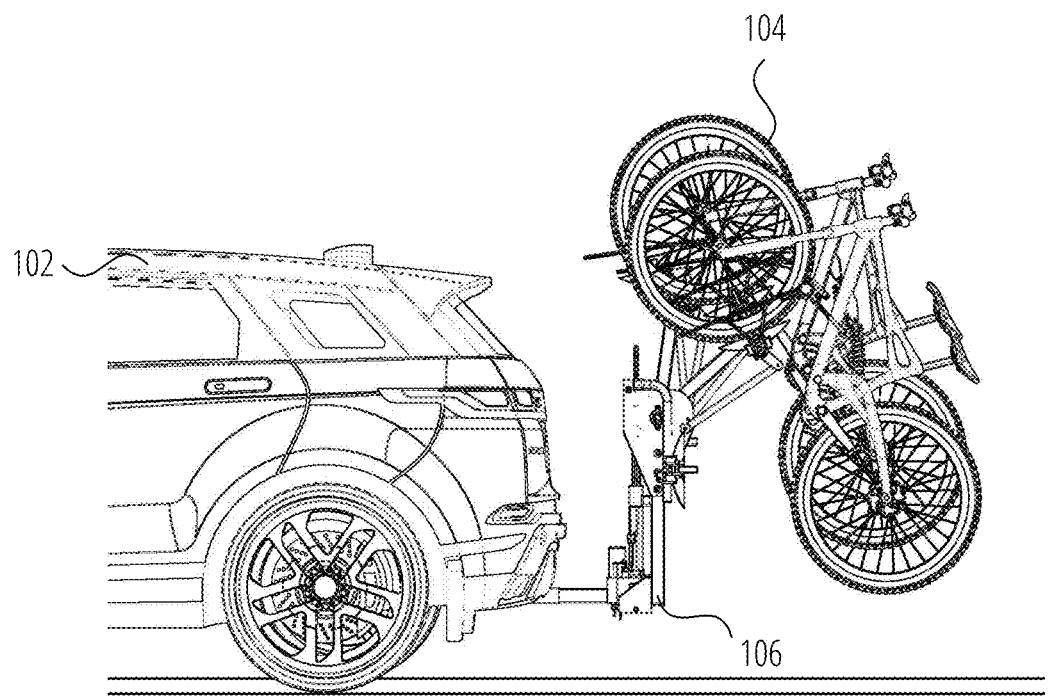
FIG. 4E illustrates a side view of bicycles attached being lifted from a ground level to an elevated level.
Figure 4F:
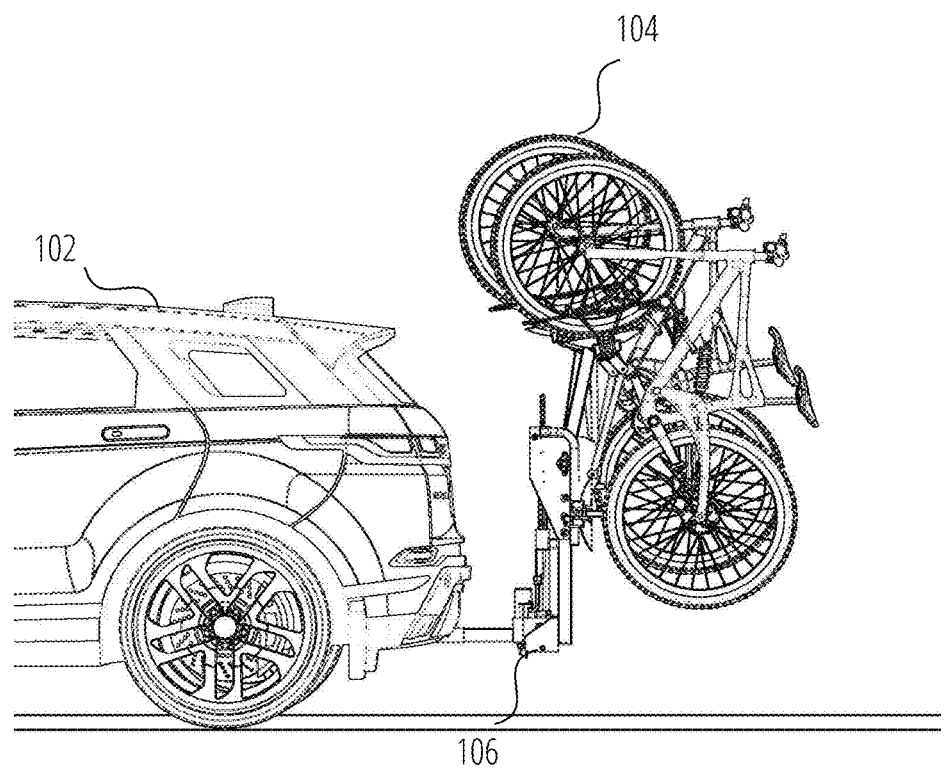
FIG. 4F illustrates a side view of bicycles being lifted from a ground level to an elevated level.

FIGS. 4A-4F illustrate a progression of the bicycles 104 being lifted from a ground or resting position to an elevated position. As shown, the bicycles 104 begin to raise upwards about the front wheel as the lifting arms raise. As further shown in FIGS. 4C-4D, as the bicycles 104 begin their move to a substantially vertical position from a horizontal position, the bicycles 104 are impacted by the yoke 312 as shown in FIG. 3. In FIG. 4F, the progression is complete and any final adjustments and/or securements may be made to prepare the bicycles 104 for transport and/or storage.

Figure 5:
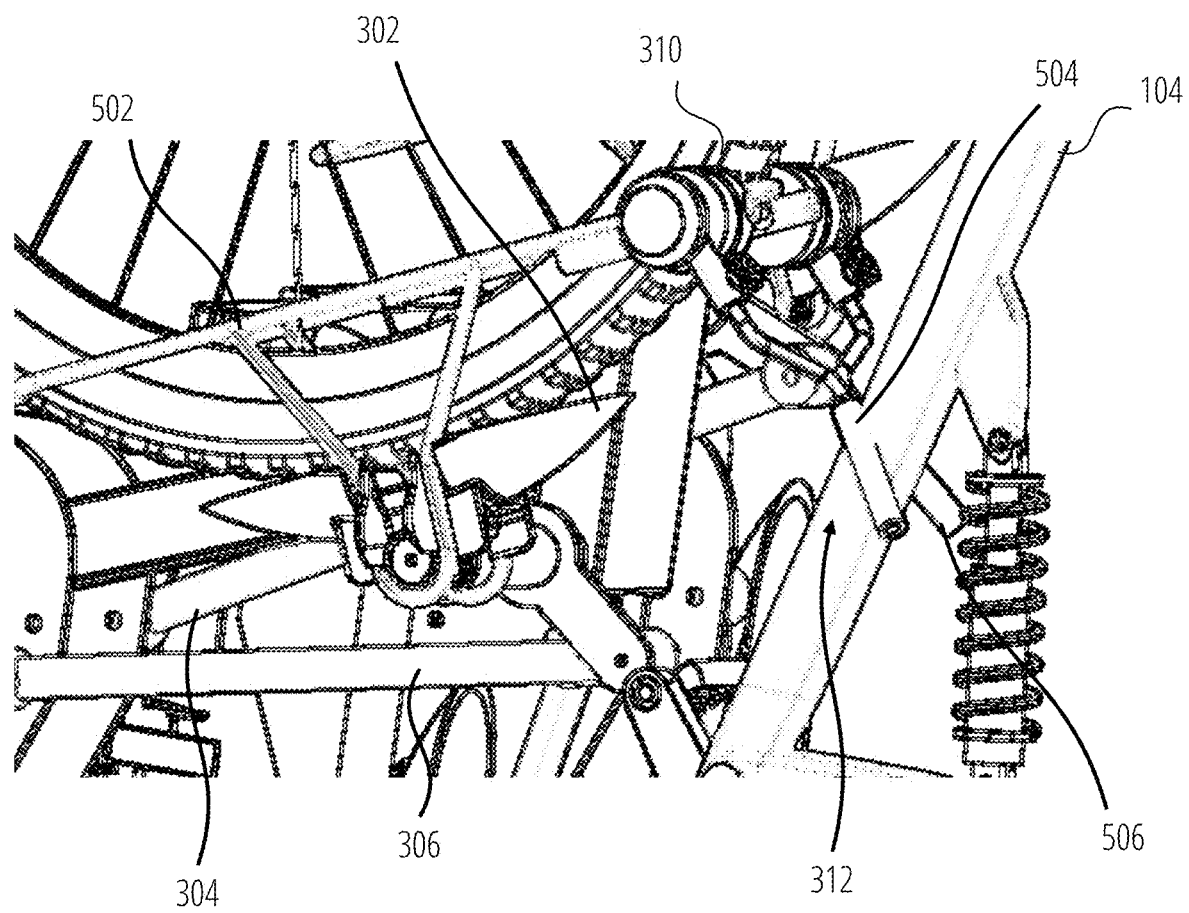
FIG. 5 illustrates a close-up view of a yoke support mechanism of the present invention.

FIG. 5 illustrates a close-up image of the structures of the rack 106 once the bicycles 104 are in an elevated position as shown in at least FIG. 2. Shown here is at least a front wheel well 302, a first lifting mechanism 304, a second lifting mechanism 306, a yoke 312, an attachment mechanism 502, a first prong 504, and a second prong 506.

Once the front wheel 310 is paired with the front wheel well 302 and retained by the attachment mechanism, the front wheel 310 is intended to be secured and "locked" into position. However, the frame of the bicycle 104 may remain freer relative to the front wheel 310.

A yoke 312 comprising of a first prong 504 and a second prong 506 is therefore utilized to stabilize a frame of the bicycle 104. The yoke 312 as previously described may automatically rotate into place as needed during the lifting process or may be manually manipulated into position. The "v" shape formed by the yoke 312 and its prongs allows the yoke 312 to engage a frame of the bicycle 104 to further reduce movement of the bicycle 104 during transport and storage. The first lifting mechanism 304 and the second lifting mechanism 306 further aid in the position securing structures of the rack 106.

Figure 6:
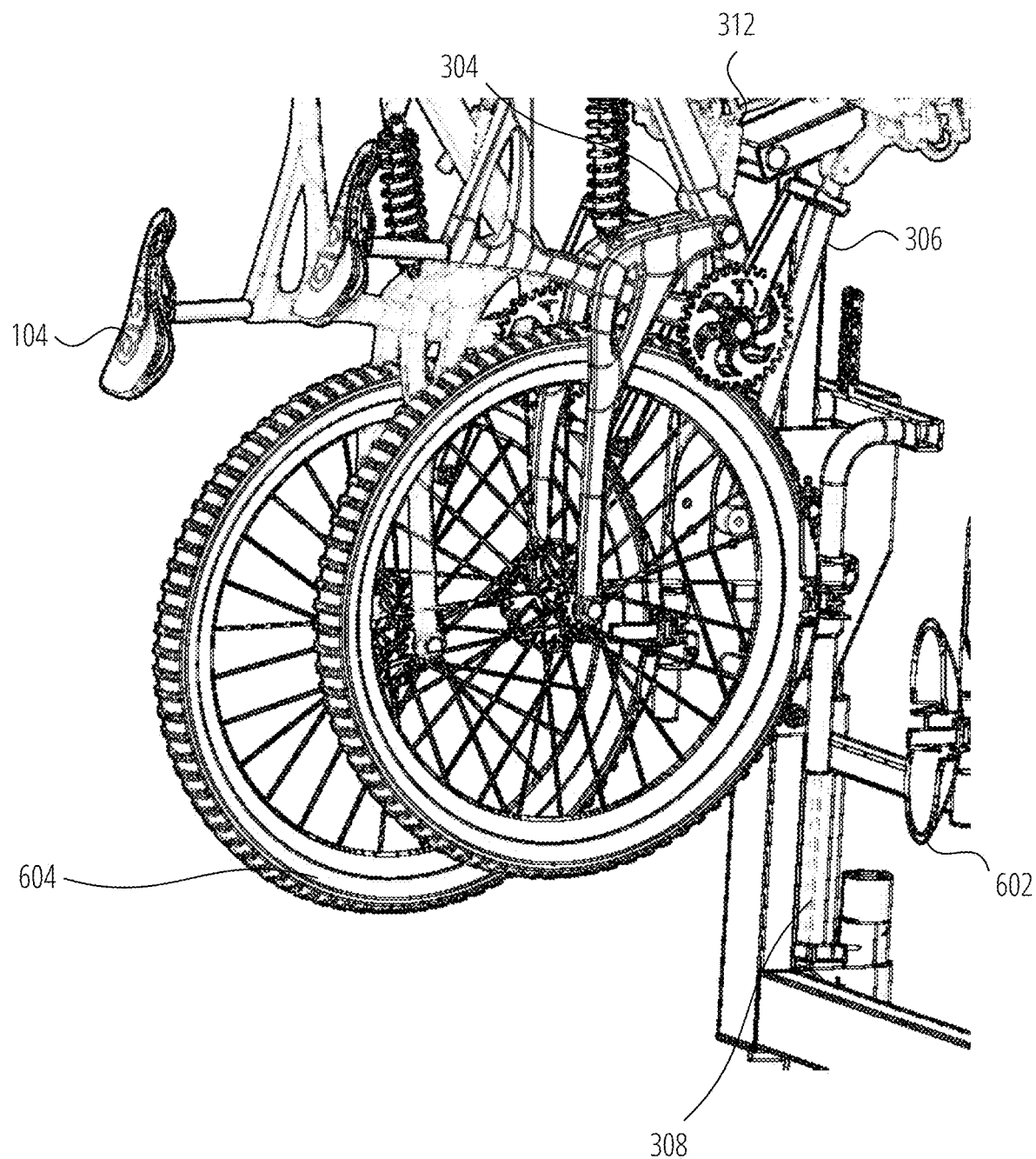
FIG. 6 illustrates a close-up view of a rear tire support mechanism.

Referring now to FIG. 6, shown is at least bicycles 104, a first lifting mechanism 304, a second lifting mechanism 306, a rack arm 308, a yoke 312, rear wheel 604, and a rear wheel well 602. Once the bicycles 104 are in an elevated position as shown in at least FIGS. 2 and 5, the lower end of the bicycles 104 take the appearance of that of FIG. 6.

The rear wheel 604 is shown to align with the rear wheel well 602. The rear wheel well 602 is positioned along a length of the rack 106 such that the rear wheel well 602 may be adjusted along the length to accommodate bicycles 104 of various proportions. An additional strap (not shown) or another securement mechanism may be necessary to further couple the rear wheel 604 to the rear wheel well 602. For example, if a bump in a road is hit it could cause the bicycles 104 to "jump" out of position or rotate is some manner about the front wheel axis. By strapping or "locking" the rear wheel 604 into the rear wheel well 602 such movement can be prevented.

The alternate embodiment shown here in FIGS. 7-14 comprises at least a rack arm 308, a first platform 702, a second platform 704, a stanchion 706, a securement mechanism 708, and an at least one electrical receptacle 710.

Figure 7:
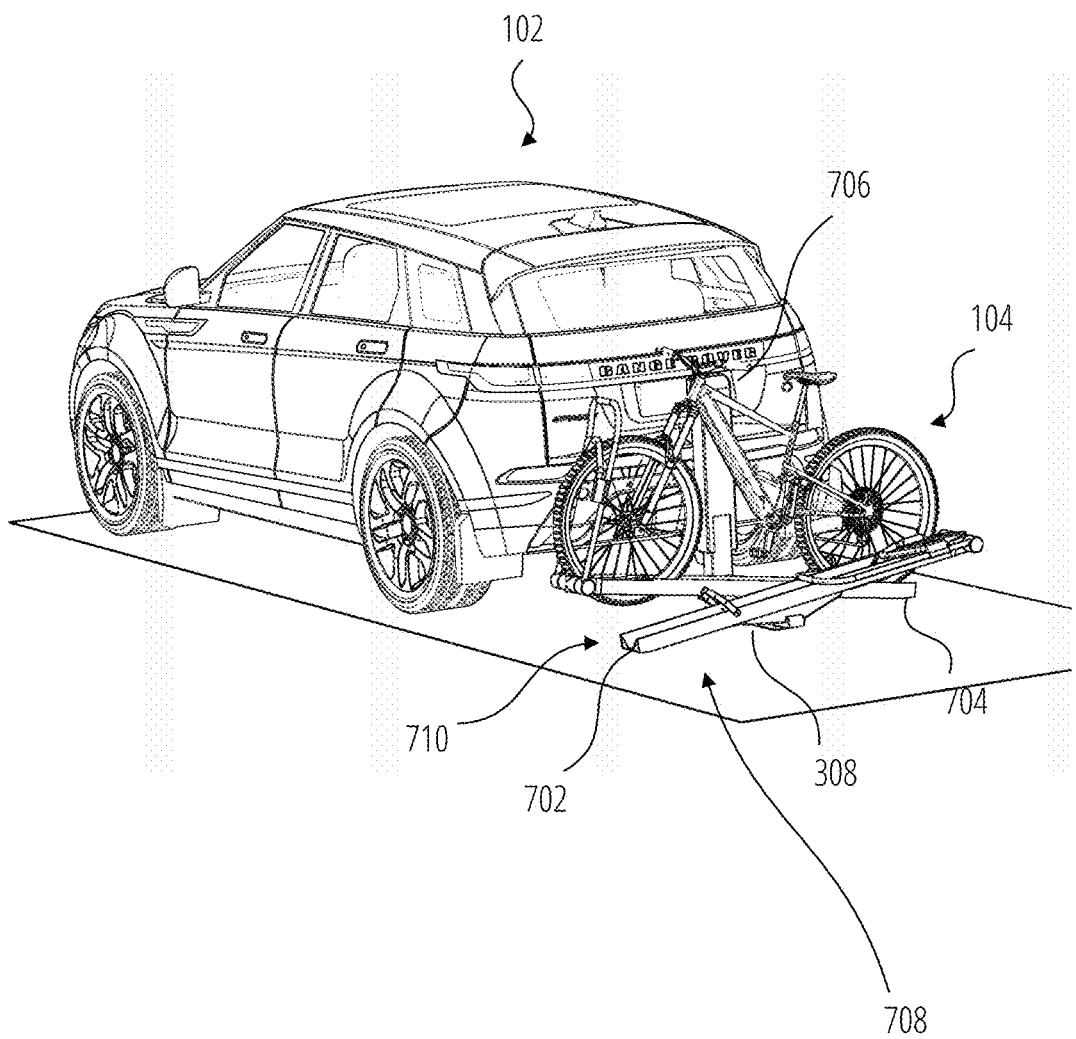
FIG. 7 illustrates a perspective view of a second embodiment of the present invention with one bicycle thereon.
Figure 8:
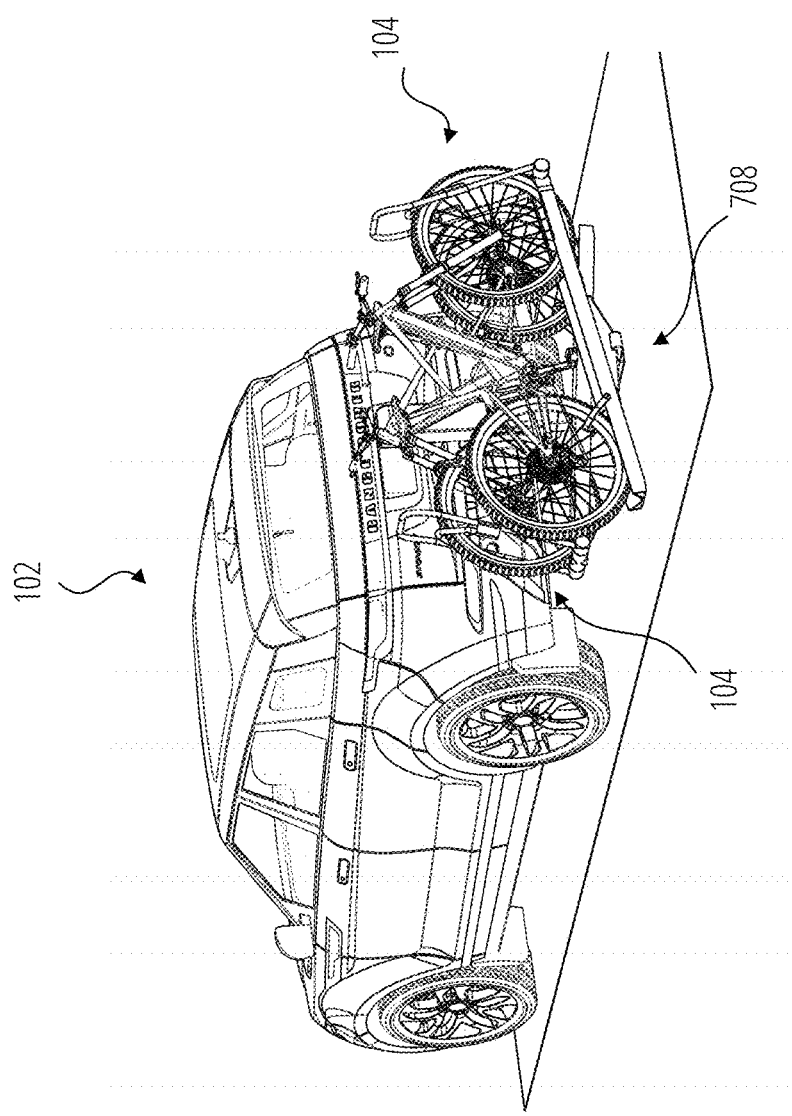
FIG. 8 illustrates another perspective view of the second embodiment of the present invention with two bicycles thereon.
Figure 9:
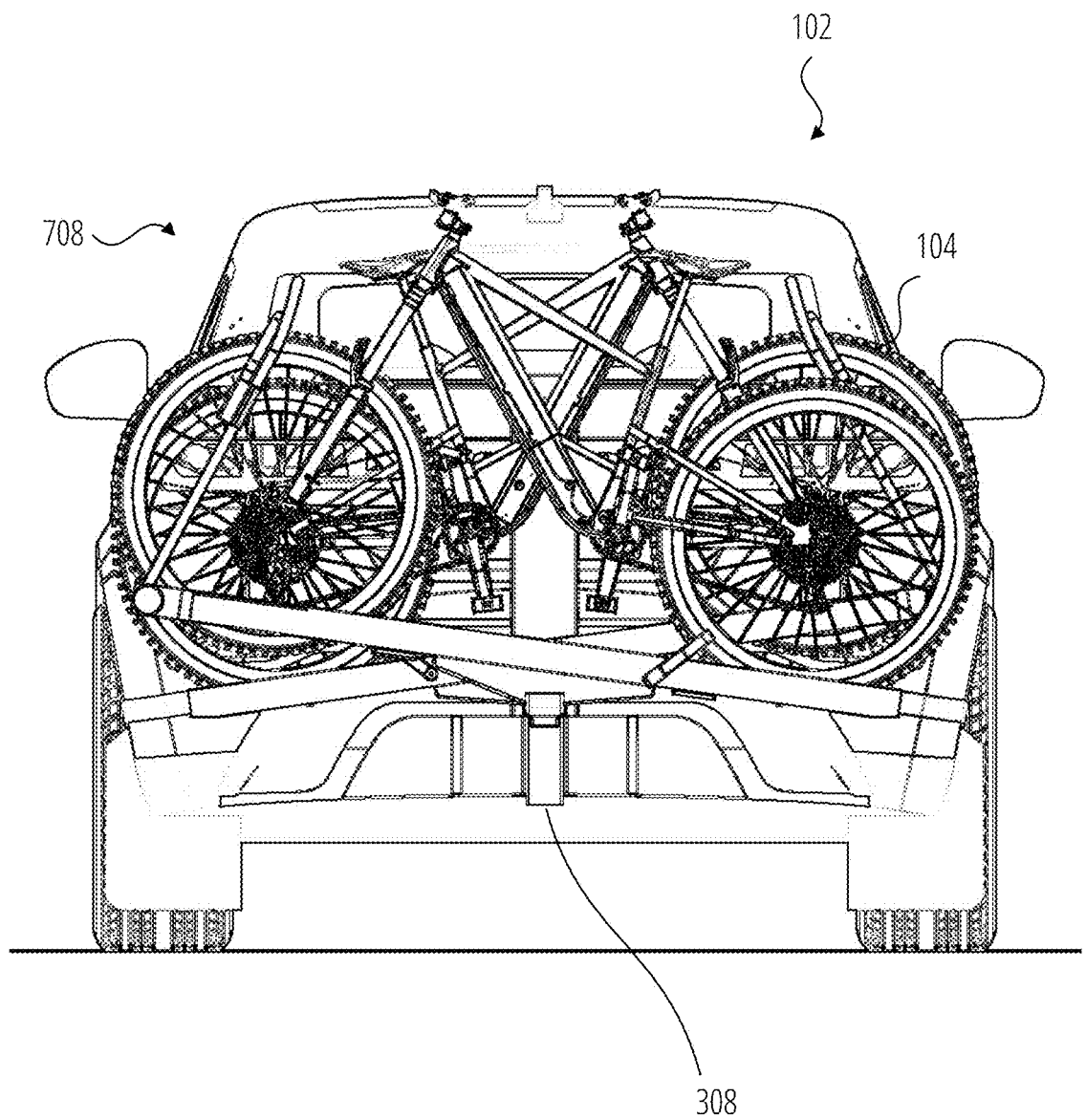
FIG. 9 illustrates a rear view of the second embodiment of the present invention with two bicycles thereon.

As shown in FIGS. 7-9 bicycles 104 are coupled to the rack 708 and the rack may then, in turn, be coupled to a vehicle 102. As previously described the rack 708 may be coupled to a trailer hitch 110 of the vehicle. Shown generally is the rack 708 from differing views as well as with differing number of bicycles 104 positioned thereon. From the rear view, as shown in FIG. 9, it is apparent how the first platform 702 and second platform 704 are at differing angles relative to one another. This forms an "X" configuration between the platforms. The main advantage is this that "X" configuration allows for multiple bicycles to be positioned such that the handlebars and other structural elements of the bicycles to not impact or damage one another. In general, the first platform 702 and the second platform 704 of the rack 708 may be substantially the same as one another or different depending on the intended end use case.

To load one or more bicycles on the rack 708, one begins as shown in FIG. 7. The rack 708 is placed into a lowered position as shown. The rack in a raised, transport position is alternatively shown in FIG. 9. When the rack 708 is in a lowered position, one approaches a second end 710 of the respective platform allowing the platform to thereby act as a ramp to assist loading a bicycle 104 thereon. Due to the configuration of the platforms, the second end of each the respective platforms are on opposing sides of the rack 708 from one another.

As one moves the bicycle 104 "up" the length of the platform, the front tire 712 will encounter a wheel well 1204 or cut out in the platform which is configured to receive the front tire 1202 therein.

This wheel well 1204 is a cutout or void in the platform surface. The generally diamond shape of the wheel well 1204 allows for tires of various shapes and sizes to be supported by the wheel well 1204. Ultimately, in order to stabilize the bike while applying the front arm, the front wheel drops into a diamond-shaped wheel well 1204 that can hold both small and large diameter tires as well as narrow and fat tires.

Once the front tire 1202 is positioned in the wheel well 1204, a user can engage the locking arm 1206 The locking arm 1206 is rotatably coupled to the first end of the platform. The locking arm 1206 preferably comprises a pivot having a one-way ratchet that locks the front tire 1202 in place when the locking arm 1206 is fully engaged with the front tire 1202. A separate release button allows the locking arm 1206 to open or release the front tire 1202 when desired by the user.

To accommodate tires with differing diameters, the locking arm 1206 has an adjustable bracket 1208 affixed to the locking arm 1206 that can be positioned up and down (relative to its position along a length of the locking arm 1206) for optimal fit. For example, a user may pull up (towards a top of the locking arm 1206) to cause the bracket coupling the adjustable bracket 1208 to the locking arm 1206 to slide along a length of the locking arm 1206 thereby changing a position at which an apex of the locking arm 1206 engages with a front tire 1202. The adjustable bracket 1208, like the locking arm 1206, may have a locking mechanism and a release thereby preventing the adjustable bracket 1208 from moving during transport of the bicycle 104 or during other undesired times (e.g. being bumped or brushed by an external force).

Once the front tire 1202 is secured by the locking arm 1206 and/or adjustable bracket 1208, the back tire 1210 may be positioned and secured to the respective platform via a rear wheel strap 1212. The rear wheel strap 1212 may be permanently affixed at one end to the platform and releasably coupled to the platform at another end. This allows for the rear wheel strap 1212 to selectively release the rear tire 1210 from the respective platform. In at least one embodiment, the rear wheel strap 1212 uses a Velcro® fastener to secure a position of the rear wheel strap 1212. In other embodiments, more substantial and resilient mechanisms may be used such as ratchet mechanisms. The rear wheel strap 1212 is to be sized and shaped such that it fits between the spokes of the rear tire 1210 to secure a position of the rear tire 1210 to the respective platform.

The first platform 702 and the second platform 704 are further coupled to the vehicle by a rack arm 308. The rack arm 308 as shown may comprise multiple arms or a singular arm. The rack arms 308 preferably attach to an underside of the platforms such that the presence of the rack arms 308 does not impede or intrude upon a position of the apparatus disposed on an upper surface of the platforms. The rack arm 380 is configured to be coupled to the stanchion 706. The stanchion is located between the first platform 702 and the vehicle 102 and contains a linear actuator. The rack arm 308 provides support to the platforms and the stanchion 706 serves to primarily house the movement mechanisms which allow the rack 708 to be lowered (see FIG. 7) and raised (see FIG. 9). The rack 708 when raised up for transport by means of a linear actuator located within the stanchion 706 preferably provides for a minimum road clearance of 20" which is necessary for the rack 708 to clear any steep inclines in the road topography. In some embodiments, raising and lowering of the rack 708 may be controlled a remote module such as a dedicated remote control or a mobile device operating a mobile application thereon.

Further, the rack 708 is capable of being mechanically locked in the up or raised position to mitigate any actuator malfunction during transport. In another embodiment, the rack 708 also has an accelerometer that would lock-out or prevent operation of the remote control, if any, during transport of the bicycles 104 on the rack 708. Further safety features may also include a mechanical safety lock that will prevent accidental lowering of the actuator during transport or failure of the actuator. This mechanical safety lock will also lock-out the remote controller from accidental operation.

Figure 10:
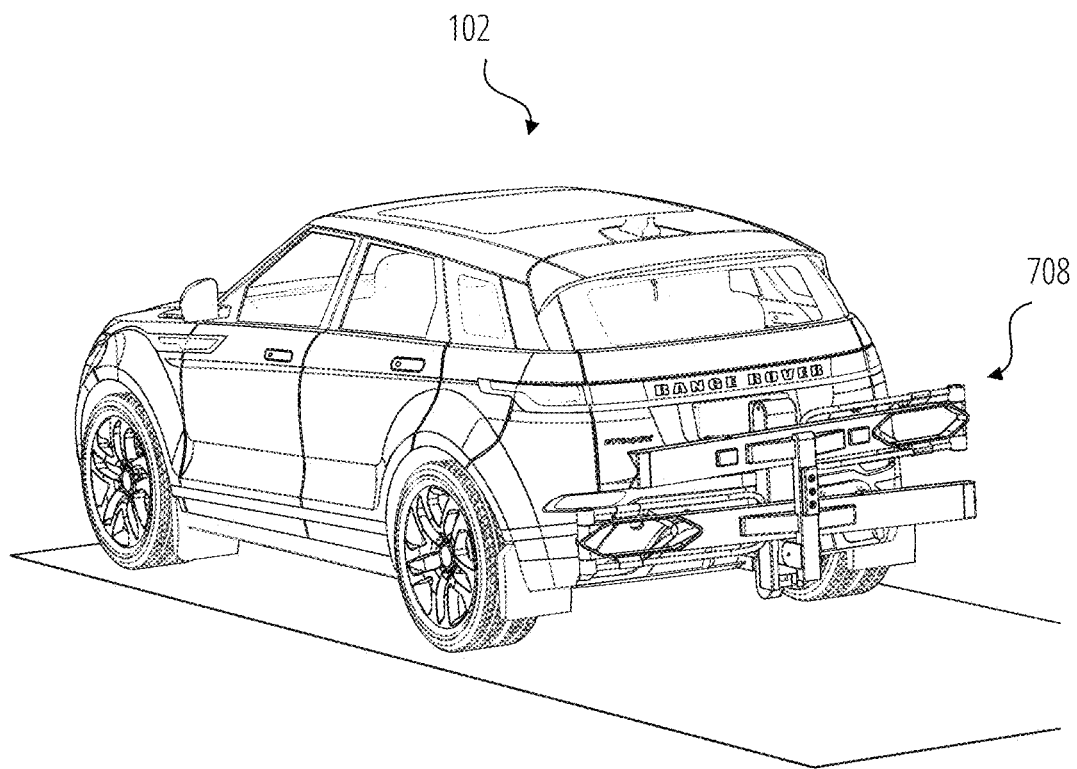
FIG. 10 illustrates a perspective view of the second embodiment of the present application in a folded or stowaway configuration.
Figure 11:
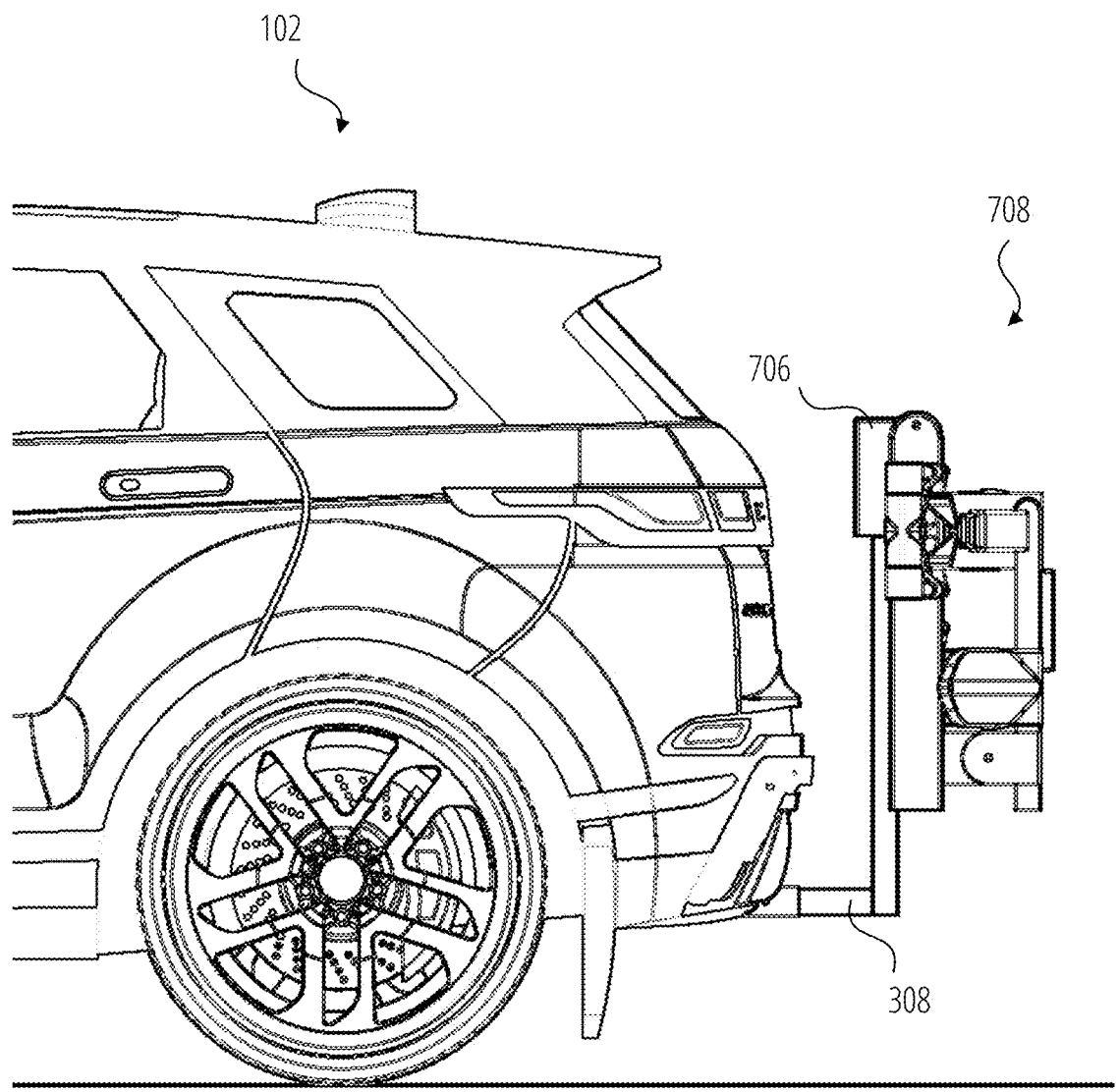
FIG. 11 illustrates a side view of the second embodiment of the present application in a folded or stowaway configuration.
Figure 12:
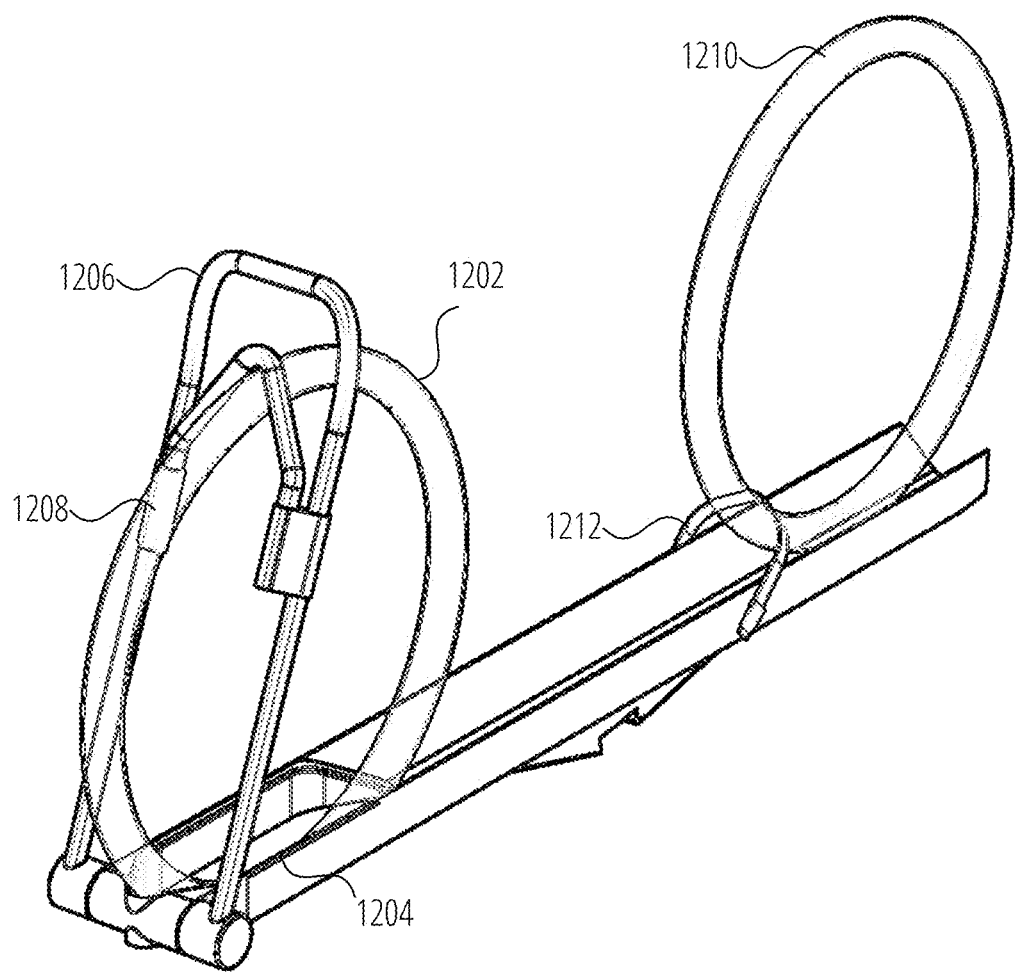
FIG. 12 illustrates a bicycle interaction between the tires of a bicycle and the second embodiment of the present application.
Figure 13:
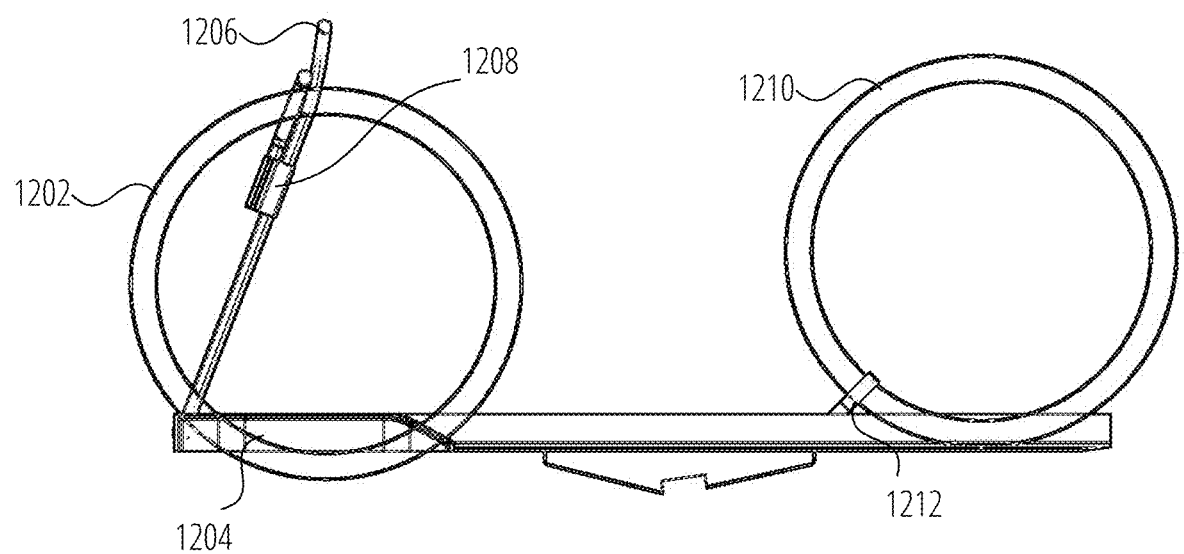
FIG. 13 illustrates a second view of a bicycle interaction between the tires of a bicycle and the second embodiment of the present application.

If the rack 708 is not intended to be used, the rack 708 may be placed in a storage position as shown in FIGS. 10 and 11. A separate motor (apart from motor or linear actuator in stanchion) may drive the platforms to this storage position. In at least one embodiment, the rack 708 may be capable of being tilted away from the vehicle (when in transport or storage position) to allow access to the hatch of the vehicle.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A vehicle rack comprising:
   a first platform having a first end, a second end, and a first wheel well;
   a second platform having a first end, a second end, and a second wheel well;
   a first locking arm coupled to the first end of the first platform,
      wherein the first locking arm is configured to secure a front wheel of a first bicycle to the first platform, and
      wherein the first locking arm comprises a ratchet mechanism and a release mechanism;
   a second locking arm coupled to the first end of the second platform,
      wherein the second locking arm is configured to secure a front wheel of a second bicycle to the second platform, and
      wherein the second locking arm comprises a ratchet mechanism and a release mechanism;
   a rack arm coupled to the first platform;
   a first wheel strap coupled to the second end of the first platform,
      wherein the first wheel strap is configured to secure a rear wheel of a first bicycle to the first platform;
   a second wheel strap coupled to the second end of the second platform,
      wherein the second wheel strap is configured to secure a rear wheel of a second bicycle to the second platform, and
      wherein the second end of the first platform is opposite from the second end of the second platform;
   a stanchion positioned between the first platform and the vehicle,
      wherein the stanchion is configured to raise and lower the first platform;
   wherein the second platform is configured to be positioned at an offset angle about an x-axis in relation to the first platform;
   wherein the second end of the second platform is configured to be lower in height than the first end of the first platform; and
   wherein the first end of the second platform is configured to be higher in height than the second end of the first platform.

2. The vehicle rack of claim 1 further comprising a motor operably coupled to the stanchion to allow the stanchion to raise and lower a position of the first platform.

3. A vehicle rack comprising:
   a first platform having a first end, a second end, and a first wheel well,
      wherein the first wheel well is a diamond-shaped opening in the first platform;
   a second platform having a first end, a second end, and a second wheel well,
      wherein the second wheel well is a diamond-shaped opening the second platform;
   a first locking arm coupled to the first end of the first platform,
      wherein the first locking arm is configured to secure a front wheel of a first bicycle to the first platform, and
      wherein the first locking arm comprises a one-way ratchet mechanism and a release mechanism;
   a first wheel strap coupled to the second end of the first platform,
      wherein the first wheel strap is configured to secure a rear wheel of a first bicycle to the first platform;
   a second locking arm coupled to the first end of the second platform,
      wherein the second locking arm is configured to secure a front wheel of a second bicycle to the second platform, and
      wherein the second locking arm comprises a one-way ratchet mechanism and a release mechanism;
   a second wheel strap coupled to the second end of the second platform,
      wherein the second wheel strap is configured to secure a rear wheel of a second bicycle to the second platform, and
      wherein the second end of the first platform is opposite from the second end of the second platform;
   a rack arm coupled to the first platform and the second platform;
   a stanchion positioned between the first platform and the vehicle,
      wherein the stanchion is configured to raise and lower the first platform and the second platform;

wherein the second platform is configured to be positioned at an offset angle about an x-axis in relation to the first platform;

wherein the second end of the second platform is configured to be lower in height than the first end of the first platform; and wherein the first end of the second platform is configured to be higher in height than the second end of the first platform.

4. The vehicle rack of claim 3 further comprising a first adjustable bracket coupled to the first locking arm.

5. The vehicle rack of claim 3 further comprising a second adjustable bracket coupled to the second locking arm.

6. The vehicle rack of claim 4 wherein the first adjustable bracket is configured to slidably engage the first locking arm.

7. The vehicle rack of claim 5 wherein the second adjustable bracket is configured to slidably engage the second locking arm.

8. The vehicle rack of claim 3 wherein when a bicycle tire is positioned in the first wheel well or the second wheel well, a bottom of the bicycle tire is below a bottom surface of the first platform or the second platform.

\* \* \* \* \*